US005874117A

United States Patent [19]
Sundram et al.

[11] Patent Number: 5,874,117
[45] Date of Patent: *Feb. 23, 1999

[54] BLENDS OF PALM FAT AND CORN OIL PROVIDE OXIDATION-RESISTANT SHORTENINGS FOR BAKING AND FRYING

[75] Inventors: Kalyana Sundram, Selangor, Malaysia; Daniel Perlman, Arlington; Kenneth C. Hayes, Wellesley, both of Mass.

[73] Assignee: Brandeis University, Waltham, Mass.

[ * ] Notice: The term of this patent shall not extend beyond the expiration date of Pat. No. 5,578,334.

[21] Appl. No.: 755,591

[22] Filed: Nov. 25, 1996

Related U.S. Application Data

[63] Continuation-in-part of Ser. No. 626,461, Apr. 2, 1996, which is a continuation-in-part of Ser. No. 418,641, Apr. 7, 1995, Pat. No. 5,578,334.

[51] Int. Cl.$^6$ ............................................. A23D 9/00
[52] U.S. Cl. ......................................... 426/2; 426/607
[58] Field of Search ........................... 426/607, 2, 606

[56] References Cited

U.S. PATENT DOCUMENTS

| | | | |
|---|---|---|---|
| 3,563,766 | 2/1971 | Matsui | 426/606 |
| 3,649,295 | 3/1972 | Bernhart | 426/607 |
| 4,391,838 | 7/1983 | Pate | 426/606 |
| 4,960,606 | 10/1990 | Crosby | 426/606 |
| 4,961,951 | 10/1990 | Crosby | 426/606 |
| 5,151,291 | 9/1992 | Tokairen | 426/606 |
| 5,223,285 | 6/1993 | DeMichele | 426/801 |
| 5,268,191 | 12/1993 | Crosby | 426/606 |
| 5,380,544 | 1/1995 | Kleman | 426/607 |
| 5,382,442 | 1/1995 | Perlman et al. | 426/607 |
| 5,436,021 | 7/1995 | Bodor | 426/606 |
| 5,514,407 | 5/1996 | Perlman | 426/601 |
| 5,518,753 | 5/1996 | Bracco | 426/606 |
| 5,578,334 | 11/1996 | Sundram | 426/2 |
| 5,626,703 | 5/1997 | Perlman | 426/607 |

FOREIGN PATENT DOCUMENTS

| | | | |
|---|---|---|---|
| 569313 | 1/1959 | Canada | 426/606 |
| 613298 | 1/1961 | Canada | 426/606 |
| 0536976 A2 | 4/1993 | European Pat. Off. | 426/606 |
| 2208079A | 2/1989 | United Kingdom | 426/606 |

OTHER PUBLICATIONS

Gunstone 1983 Lipids in Foods Chemistry, Biochemisty and Technology Pergamon Press New York pp. 148–152.

Swern 1979 Baileys Industrial Oil and Fat Products vol. 1, 4th ed. John Wiley & Sons New York pp. 342–345, 374–379, 389–392.

Agriculture Handbook No. 8–4, U.S.D.A. Science and Education Administration, *Composition of Foods: Fats and Oils.*

Berry et al., "Physicochemical characteristics of palm olein and soybean oil blends," *Palm Oil Technol. Eighties, Rep. Proc. Int. Conf.* pp. 483–498 (1981) (pub. 1983).

Charnock et al., "Dietary modulation of lipid metabolism and mechanical performance of the heart," *3rd Int. Symp. on Lipid Metabolism in the Normal and Ischemic Heart* (Sep. 9–10, 1991).

Choi et al., "Effect of dietary n–3 polyunsaturated fatty acids on cholesterol synthesis and degradation in rats of different ages," *Lipids* 24(1):45–50 (1989).

Demacker et al., "Increased Removal of remnants of triglyceride–rich lipoproteins on a diet rich in polyunsaturated fatty acids," *European J. of Clin. Invest.* 21:197–203 (1991).

Grundy and Denke, "Dietary Influences on serum lipids and lipoproteins," *J. Lipid Research* 31:1149–1172 (1990).

Grundy, "Comparison of Monounsaturated Fatty Acids and Carbohydrates for Lowering Plasma Cholesterol," *N. Eng. J. Med.* 314:745–748 (1986).

Grundy et al., "Influence of stearic acid on cholesterol metabolism relative to other long–chain fatty acids[1–3]," *American J. Clin. Nutr.* 60(suppl.):986S–990S (1994).

"Fat Stability: Active Oxygen Method," in *AOCS Official Method: Cd 12–57*, American Oil Chemists Society, pp. 1–4 (1991).

Fujikawa, "Manufacture of Salad Oil," *Jpn. Kokai Tokkyo Koho JP* 61,293,389 [86,293,389] (Dec. 24, 1986).

Haga, "Manufacture of edible Oils," *Jpn. Kokai Tokkyo Koho JP* 61,296,096 [86,296,096] (Dec. 26, 1986).

Han et al., "Effect of palm oil blending on the thermal and oxidative stability of soybean oil," *Han'guk Sikp'um Kwahakhoechi* 23(4):465–70 (1991).

Hayes et al., "Dietary saturated fatty acids (12:0, 14:0, 16:0) differ in their impact on plasma cholesterol and lipoproteins in nonhuman primates[1–4]," *Am. J. Clin. Nutr.* 53:491–498 (1991).

Hayes and Kholsa, "Dietary fatty acid thresholds and cholesterolemia," *FASEB* 6:2600–2607 (1992).

Hegsted et al., "Quantitative Effects on Dietary Fat on Serum Cholesterol in Man," *Amer. J. of Clin. Nutr.* 17:281–295 (1965).

Hegsted et al., "Dietary fat and serum lipids: an evaluation of the experimental data[1–4]," *Amm. J. of Clin. Nutr.* 57:875–883 (1993).

Heyden "Polyunsaturated and Monounsaturated Fatty Acids in the Diet Prevent Coronary Heart Disease via Cholesterol Reduction," *Ann. Nutr. Metab.* 38:117–122 (1994).

Jacobs et al., "Variability in Individual Serum Cholesterol Response to Change in Diet," *Arteriosclerosis*, 3:349–356 (1983).

(List continued on next page.)

*Primary Examiner*—Carolyn Paden
*Attorney, Agent, or Firm*—Lyon & Lyon LLP

[57] ABSTRACT

An oxidation-resistant food shortening which includes a blended vegetable fat composition having between 50% and 95% by weight palm fat and between 5% and 50% corn oil. Also, described is a method of increasing the polyunsaturated fatty acid content of a palm fat-containing shortening while minimizing the loss in oxidative stability of the shortening, wherein the palm fat is supplemented with between approximately 5% and 100% by weight corn oil.

17 Claims, 3 Drawing Sheets

OTHER PUBLICATIONS

Kajimoto et al., "Influence of blend ratio of vegetable oils on their thermal oxidation and decomposition of tocopherol," *Nippon Eiyo, Shokuryo Gakkaishi* 44(6):499–505 (1991).

Katan et al., "Effects of fats and fatty acids on blood lipids in humans: an overview1–4," *Am. J. Clin. Nutr.* 60(suppl):1017S–1022S (1994).

Khosla and Hayes, "Dietary fat saturation in rhesuss monkeys affects LDL concentrations by modulating in independent production of LDL apolipoprotein B," *Biochem. Biophys., Acta* 1083:46–56 (1991).

Khosla and Hayes, "Comparison between the effects of dietary saturated (16:0), monounsaturated (18:1), and polyunsaturated (18:2) fatty acids on plasma lipoprotein metabolism in cebus and rhesus monkeys fed cholesterol–free diets," *Am. J. Clin. Nutr.* 55:51–62 (1992).

Kifli et al., "Physical properties of interesterified palm oil/palm oil fractions with other vegetable oils," *Palm Oil. Prod. Technol. Eighties, Rep. Proc. Int. Conf.* pp. 303–314 (1981) (published 1983).

Kim, "Relationship between the triacylglycerol composition and foaming of mixed coconut oil under deep–fat frying," *Agric. Biol Chem.* 52(3):693–699 (1988).

Lin et al., "Oxidative stability of Malaysian palm oil and its blends," *Yukagaku* 39(12):1045–1049 (1990).

Litherland et al., "Preparation of chocolate fats by wet fractionation of soya oil," Abst. of EP 428,200 May 22, 1991, GB 89/25,943 (Nov. 16, 1989).

Majumdar et al., "Vanaspati and margarine fat base from palm oil and palm stearin by corandomization with cottonseed oil," *J. Oil Techol. Assoc. India* 18(2):37–38 (1986).

Mensink and Katan, "Effect of Dietary Fatty Acids on Serum Lipids and Lipoproteins," *Arteriosclerosis and Thrombosis* 12:911–919 (1992).

Minal et al., "Marmara's findings support the viability of blending palm oil with sunflower or soya bean oil for the Turkish cooking oil market," *Palm Oil Dev.* 21:31–34 (1994).

Murakami et al., "Effect of processed oils and fats on cholesterol metabolism. IV. Effect of palm stearin and changes in its effect by blending with soybean oil and further randomizing," *Yukagaku* 41(3):196–202 (1992).

Murakami et al., "Effect of processed oils and fats on cholesterol metabolism. V. Effect of lard, its blend with palm olein and their randomized oil," *Yukagaku* 41(7):530–537 (1992).

Neff et al., "Oxidative stability of blends and interesterified blends of soybean oil and palm olein," *J. Am. Oil Chem. Soc.* 71(10):1111–1116 (1994).

NorAini et al., "Clarity of blends of double–fractionated palm olein with low–erucic acid rapeseed oil," *J. Am. Oil Chem. Soc.* 72(4):443–448 (1995).

"Oil Stability Index," in *AOCS Official Method: Cd 12b–92*, American Oil Chemists Society, pp. 1–5 (1993).

Pala, "Frying performance of blends of palm olein with sunflower oil and soybean oil," *Malaysian Oil Sci. Technol.* 4(1):166–175 (1995).

Pronczuk et al., "Dietary myristic, palmitic, and linoleic acids modulate cholesterolemia in gerbils," *FASEB J.* 8:1191–1200 (1994).

Rasid et al., "Use and marketing of palm oil in the Mediterranean countries," *Palm Oil Dev.* 21:24–27 (1994).

Siguel and Maclure, "Relative Activity of Unsaturated Fatty Acid Metabolic Pathways in Humans," *Metabolism* 36:664–669 (1987).

Sundram et al., "Dietary palmitic acid results in lower serum cholesterol than does a lauric–myristic acid combination in normolipemic humans," *Am. J. Clin. Nutr.* 59:841–846 (1994).

Sundram et al., Fat (Fatty Acid) Modulation of Metabolism (2549–2554) *FASEB J.* 9:A440 (1995) (Abstract).

Sundram et al., "Both dietary 18:2 and 16:0 may be required to improve the serum LDL/HDL cholesterol ratio in normochrolesterolemic men," *Nutritional Biochemistry* 6:179–187 (1995).

Suzuki et al., "Fat and oil compositions for frying and spraying," *Jpn. Kokai Tokkyo Koho* JP 01,262,754 [89,262, 754] (Oct. 19, 1989).

Swern, *Baileys Industrial Oil and Fat Products*, vol 1, 4th edition, John Wiley and Sons, New York pp. 311–332 and pp. 363–368 (1979).

Wai, "A critical review of the cholesterolaemic effects of palm oil," *Food and Nutrition Bulletin* 15:112–123 (1994).

Willet and Sacks, "Chewing the Fat—How Much and What Kind," *N. Eng. J. of Med.* 324:121–123 (1991).

BLENDS OF PALM FAT AND CORN OIL PROVIDE OXIDATION-RESISTANT SHORTENINGS FOR BAKING AND FRYING

RELATED APPLICATIONS

This application is a continuation-in-part of Sundram et al., U.S. Ser. No. 08/626,461, filed Apr. 2, 1996 entitled "Increasing the HDL Level and the HDL/LDL Ratio in Human Serum by Balancing Saturated and Polyunsaturated Dietary Fatty Acids" which is a continuation-in-part of Sundram et al., U.S. Ser. No. 08/418,641, filed Apr. 7, 1995 entitled "Increasing the HDL Level and the HDL/LDL Ratio in Human Serum with Fat Blends" which will issue as U.S. Pat. No. 5,578,334, hereby incorporated by reference herein in their entirety.

BACKGROUND OF THE INVENTION

This invention relates to natural fats and natural fat blends and their use in providing oxidation-resistant shortenings as ingredients in producing baked, fried, and other prepared foods.

The discussion below is provided to assist the understanding of the reader. None of the information provided or references cited are admitted to be prior art to the present invention.

In providing shortenings for the production of commercially prepared foods such as baked and fried food products, much effort has been devoted to improving the oxidation-resistance of the shortening. The oxidation-resistance of a shortening is important for preventing or delaying the onset of rancidity in the fat component of the food, and extending the food's shelf-life.

There are several well known methods which are currently used for improving the oxidation resistance of shortenings. These include the partial hydrogenation of the triglyceride's fatty acids (resulting in a decreased proportion of the polyunsaturated linoleic and linolenic acids which are prone to oxidation), the addition of one or more antioxidants such as alpha-tocopherol or TBHQ to the shortening composition, and the interesterification and randomization of fatty acids in triglyceride mixtures constituting blends of fats and oils.

Most references in the literature describing the blending of saturated fats and polyunsaturated vegetable oils, link such blending with the interesterification or partial hydrogenation of fatty acids in these blends. It is well known in the art that interesterification allows the randomization of polyunsaturated fatty acids with saturated and monounsaturated fatty acids in the triglyceride structure. This randomization is used to alter important physical properties such as the hardness, plasticity, and melting point of fats.

With baking shortenings, control of these properties, may be used to provide firm fats for producing flaky pastry or oily shortenings for more compact pastry. Controlled hydrogenation, interesterification and blending of fats and oils is also important in producing frying oils which have sufficient resistance to high temperature oxidation (and thereby adequate frying lifetime), while also retaining a sufficiently low melting temperature (a sufficient proportion of unsaturated fatty acids) to avoid a fatty mouth feel. Saturated fats and hydrogenated oils with a relatively high melting point (significantly above body temperature) are associated with a fatty mouth feel. For example, the proportion of tripalmitin (mp=66° C.) and other trisaturated triglycerides in undiluted palm oil produces a fatty mouth feel in foods fried in this oil. For this reason, and for nutritional reasons it is desirable to blend palm oil with a vegetable oil such as soybean oil to lower the melting temperature of the palm fat by increasing the proportion of polyunsaturated fatty acids in the blend. Fractionating the palm oil produces lower melting point fractions such as palm olein and palm superolein (double fractionated), but for the nutritional reasons described in U.S. Pat. No. 5,578,334, an increase in the polyunsaturated fatty acid content of the fat, i.e., shortening, is desirable.

There are references in the literature to the direct blending of polyunsaturated vegetable oils with more stable saturated fats to reduce the rate of oxidation of the vegetable oils. For example, Berry et al. (*Palm Oil Prod. Technol. Eighties, Rep. Proc. Int. Conf.* 1981, pp. 505–518) reported that the oxidative stability of soybean oil was improved by blending with palm olein. Similarly, Lim et al.(*Yukagaku* 1990, 39(12), 1045–1049) demonstrated that when soybean oil was blended with either crude palm oil, refined bleached and deodorized palm oil, or refined palm kernel oil, oxidative stability of the soybean oil increased. Kajimoto et al.(*Nippon Eiyo, Shokuryo Gakkaishi* 1991, 44(6), 499–505) showed that the oxidative stabilities of both soybean oil and canola (rapeseed) oil are enhanced by blending with palm oil. Similarly, Han et al., (*Han'guk Sikp'um Kwahakhoechi* 1991, 23(4), pp.465–470) showed that the thermal and oxidative stabilities of soybean oil are enhanced by blending with palm oil in which the ratio of palm oil to soybean oil is greater than 50%. In yet another study, Neff et al., (*J. Am. Oil Chem. Soc.* 71(10),1111–1116, 1994) compared resistance to autoxidation provided by either blending or interesterifying between 1 and 10 parts palm olein with 1 part soybean oil, and found blending more effective. Minal et al., (*Palm Oil Dev.* (21), 31–34, 1994)), describe the blending of palm oil with either sunflower oil or soybean oil to produce frying oils with improved stability.

Other reasons for blending palm fat with polyunsaturated vegetable oils are described in the prior art literature. Rasid et al., (*Palm Oil Dev.* (21), 24–27, 1994) show that a decrease is achieved in the cloud point of palm oil and palm olein-containing edible oils by blending the oils with polyunsaturated vegetable oils including canola, rice-bran, soybean, sunflower and cottonseed oils. Pala, (*Malaysian Oil Sci. Technol.* 4(1), 166–175, 1995) describe and compare the cold stability and frying performance of blends of either sunflower, soybean, or cottonseed oils with double fractionated palm olein (also known as palm superolein), and conclude that for frying, palm-soybean oil blends are superior. NorAini et al., (*J. Am. Oil Chem. Soc.* 72(4), 443–448, 1995) compare the cloud points of blends containing double fractionated palm olein and either canola (rapeseed) oil or soybean oil, and show that blends with canola oil are superior in achieving lower cloud points to remain liquid at lower temperature.

None of the above references, however, describe the blending of palm fat and corn oil to provide improved shortenings.

SUMMARY OF THE INVENTION

This invention features the blending of corn oil with palm oil and other palm fractions to obtain shortening blends with unexpectedly good resistance to oxidation. More specifically, these shortening blends are produced by simple blending of commercially available palm oil, fractionated palm oil components (the olein, superolein, stearin, and mid-fraction components), and/or palm kernal oil with corn oil. Such shortenings represent a cost-effective alternative to those produced by partial hydrogenation of vegetable oils, interesterification of fats and oils, and supplementation of oxygen-susceptible fats and oils with antioxidants.

Crude palm oil, and refined, bleached and deodorized (RBD) palm oil have remarkable oxidative stability for a natural vegetable product, as demonstrated in side-by-side tests with polyunsaturated vegetable oils using any one of a variety of procedures including either the Rancimat test method (see below), the peroxide formation-sensitive active oxygen method (AOM) of testing (American Oil Chemists Society, AOCS Official Method Cd 12-57), or the appearance of volatile organic acids measured by the oil stability index (OSI) method (AOCS Official Method Cd12b-92). It is not unusual to see a 4 or 5-fold difference in the AOM or OSI value (in hours) between palm oil and those vegetable oils rich in polyunsaturated fatty acids such as corn oil and soybean oil, for example. Nevertheless, to obtain a shortening having the right balance of physical properties for baking, for example, and appropriate nutritional properties as described herein, it may be desirable to supplement the palm oil with a vegetable oil rich in polyunsaturated fatty acids.

Thus, in the present invention, shortenings which include corn oil blended with palm oil and other palm fractions are described. It is shown in side-by-side tests that these blends have oxidative stabilities superior to the soybean oil-palm fat blends which have been considered to be very valuable, and which are described in many literature references as having remarkable resistance to oxidation.

In the co-pending patent applications cited above by Sundram et al., the first of which will issue as U.S. Pat. No. 5,578,334, methods are described for increasing the HDL concentration and the HDL/LDL concentration ratio in human serum by the dietary consumption of foods prepared using a cholesterol-free single fat or blended fat composition containing a certain ratio of saturated fatty acid (lauric, myristic, and palmitic acids) to polyunsaturated fatty acid (linoleic acid). With these blended fat compositions, it was also shown that when the compositions contained at least one part by weight cholesterol-free saturated fat to one part by weight polyunsaturated fat, the polyunsaturated fat component was stabilized against oxidation (see Example 3 and Table 4 in these co-pending applications). It was pointed out that from these data and other experiments, oxidative stabilities of fat and oil blends is unpredictable and can only be determined by experimentation. Nevertheless, it is interesting to note that from the Rancimat test data presented in Table 4, comparing the oxidative stabilities of soybean oil and corn oil diluted 3.3-fold with either palm olein or palm oil, the corn oil blends are significantly more stable than the soybean oil blends. This is surprising in light of the emphasis in the literature placed upon soybean oil, and its significant stabilization upon dilution into palm oil. Given the lack of predictability of oxidative stabilities and the absence of information in the prior art literature on corn oil blends, testing of these blends was expanded to determine whether this observation is reproducible, and whether indeed corn oil has some property which, in combination or synergy with palm oil, allows its polyunsaturated fatty acids to be oxidized more slowly upon dilution of the corn oil into palm oil. As evidenced in the Examples below, the initial observations made using the Rancimat testing method have been confirmed using the more dependable OSI and AOM methods.

Thus in a first aspect, the invention features an oxidation-resistant food shortening which includes a blended vegetable fat containing between 50% and 95% by weight palm fat and between 5% and 50% corn oil.

In preferred embodiments, the polyunsaturated fatty acids contributed by the corn oil are better stabilized against oxidation by blending with the palm fat, than an equivalent weight percentage of polyunsaturated fatty acids contributed by soybean oil; The palm fat in this shortening is selected from the group consisting of palm oil, palm olein, palm superolein, palm midfraction, palm stearin and palm kernel oil. In a related aspect, the shortening further includes at least one fat-dispersible additive selected from the group consisting of antioxidants, antifoam agents, stabilizers, and emulsifiers. For example, approximately 200 parts per million of TBHQ is typically added to a fat or oil used in frying as an oxidant. Methyl silicone may be added as an antifoaming agent if required.

In another embodiment, the above shortening is resistant to heat-accelerated oxidation and is incorporated into a heat-prepared food selected from the group consisting of baked foods and fried foods.

In still another embodiment, the invention features a fat-containing prepared food which includes the above shortening, in which the shelf-life of the prepared food is extended by the incorporation of this shortening. In a related aspect, the fat-containing prepared food is selected from the group consisting of baked food, fried food, dessert food, margarine, salad dressing, and mayonnaise.

In another aspect of this invention, a method is featured for increasing the polyunsaturated fatty acid content of a palm fat-containing shortening while minimizing the loss in oxidative stability of the shortening, in which the palm fat is supplemented with between approximately 5% and 100% by weight corn oil (i.e., between 1:20 and 1:1 part by weight corn oil to palm fat).

In still another aspect, a method is provided for increasing the polyunsaturated fatty acid content of a palm fat-containing prepared food composition while minimizing the loss in oxidative stability of the prepared food composition, in which the palm fat is supplemented with between approximately 5% and 100% by weight corn oil.

As discussed in the Sundram et al. applications cited above, appropriate mixtures of saturated vegetable fat and unsaturated vegetable oil in a human diet results in a stablization or increase in the serum high density lipoprotein (HDL) level and an increase in the HDL/LDL (low density lipoprotein) ratio. Generally, this involves a decrease in the serum LDL level. Particularly advantageous mixtures include palm fat/corn oil mixtures such as those described in the above aspects. Thus, ingestion of food products prepared using such mixtures provides a diet which tends to enhance the HDL/LDL ratio.

In this context, the term "sustained" or "sustaining" indicates that the HDL level remains essentially constant. However, the term also encompasses small decreases, i.e., no more than 5% decrease. Preferably the HDL level does not decline at all, or increases. Realizing that the biological response in HDL of different populations or subpopulations, to a given fat blend may differ slightly in magnitude, it is important to include in the concept of HDL regulation the notion that HDL stabilization (when coupled with an increase in the HDL/LDL concentration ratio) is itself a nutritionally valuable achievement when compared the effect of a simple fat such as safflower oil that lowers HDL more than 5%.

Therefore, in a related aspect, the invention provides a method of sustaining or increasing the HDL concentration and increasing the HDL/LDL ratio in the serum of a human by providing in the daily diet of the human a mixture of palm fat and corn oil in the proportions described above.

In a related aspect, the invention provides a method of sustaining or increasing the HDL concentration and increasing the HDL/LDL concentration ratio in human serum by providing a balance between a sufficient and required proportion of cholesterol-free saturated fatty acids in the daily dietary fat of said human and a sufficient and required, but not excessive proportion of polyunsaturated fatty acids comprising linoleic acid in said dietary fat. The remaining proportion of fatty acids and energy from the dietary fat is provided by monounsaturated fatty acids, including oleic acid. The saturated fatty acids preferably constitute between 20% and 40% by weight of the daily dietary fat based upon the dietary fat accounting for 30% of the total dietary energy consumption. The linoleic acid preferably constitutes between 15% and 40% by weight of the dietary fat. With these proportions, the required proportional intake of the polyunsaturated fatty acids enhances the formation of HDL from VLDL and/or decreases the clearance of HDL, while an excessive proportional intake of the polyunsaturated fatty acids and the monounsaturated fatty acids is avoided to assure a sufficient dietary availability of the saturated fatty acids, which are required for sufficient VLDL synthesis and HDL production. In this method, at least 20% of daily dietary fat is provided by fat-containing prepared foods which are prepared using a palm fat/corn oil shortening as described in the first aspect above. Such foods can, for example, include baked food, fried food, dessert food, margarine, salad dressing, and mayonnaise. However, the proportion of dietary fat so provided may be higher, e.g., 30, 40, 50 or more percent.

In a preferred embodiment, the proportion of monounsaturated fatty acids in the daily dietary fat is between 20% and 50% oleic acid and no greater than 1% elaidic acid, or other unnatural trans fatty acids by weight.

In another related aspect, the invention provides a method of decreasing the LDL concentration in human serum by providing saturated fatty acids in the daily diet in a proportion between 20% and 40% by weight of the daily dietary fat based upon the dietary fat accounting for 30% of the total dietary energy consumption, and maintaining a proportion of polyunsaturated fatty acids comprising linoleic acid in the daily diet at the expense of monounsaturated fatty acids comprising oleic acid and/or elaidic acid, wherein said linoleic acid constitutes between 15% and 40% by weight of said dietary fat, whereby removal of plasma VLDL remnants and LDL is maximized, and the production of LDL is reduced. At least 20% of the daily dietary fat is provided by fat-containing prepared foods as described in the preceeding aspect.

In yet another related aspect, the invention provides a method of sustaining or increasing the HDL and decreasing the LDL concentration in human serum by providing saturated fatty acids in the daily diet in a proportion between 20% and 40% by weight of the daily dietary fat based upon the dietary fat accounting for 30% of the total dietary energy consumption. In this way the production of VLDL, as the HDL precursor, is adequately sustained and is not rate limiting in HDL biosynthesis. In addition, the method involves maintaining a proportion of polyunsaturated fatty acids, including linoleic acid, in the daily diet at the expense of monounsaturated fatty acids, including oleic acid and/or elaidic acid. The linoleic acid constitutes between 15% and 40% by weight of the dietary fat. In this way the VLDL catabolism to HDL is facilitated and hepatic clearance of VLDL remnants and LDL is enhanced. As above, at least 20% of the daily dietary fat is provided by prepared foods, which are prepared using a shortening of the first aspect.

In yet another related aspect, the invention provides a method of sustaining or increasing the HDL concentration and increasing the HDL/LDL concentration ratio in human serum by the dietary consumption of foods prepared using a cholesterol-free shortening containing a ratio of one part by weight polyunsaturated fatty acids to at least one part by weight saturated fatty acids. The shortening includes linoleic acid and at least one saturated fatty acid selected from the group including lauric acid, myristic acid, and palmitic acid. The linoleic acid constitutes between 15% by weight and 40% by weight of the shortening and the saturated fatty acid constitutes between 20% and 40% by weight of the shortening. As a result, adequate dietary levels of saturated fatty acids in the absence of cholesterol stimulate VLDL synthesis and secretion by the liver, and adequate dietary levels of linoleic acid enhance LPL activity and generation of HDL from VLDL while stimulating the removal of VLDL remnants and LDL and concommitently decreasing CETP activity and HDL catabolism.

Additional features and advantages of the invention will be apparent from the following detailed description of the invention in conjunction with the accompanying drawings and from the claims.

BRIEF DESCRIPTION OF THE DRAWINGS

The drawings will first be briefly described.

Drawings

DETAILED DESCRIPTION OF THE INVENTION

Figure 1:
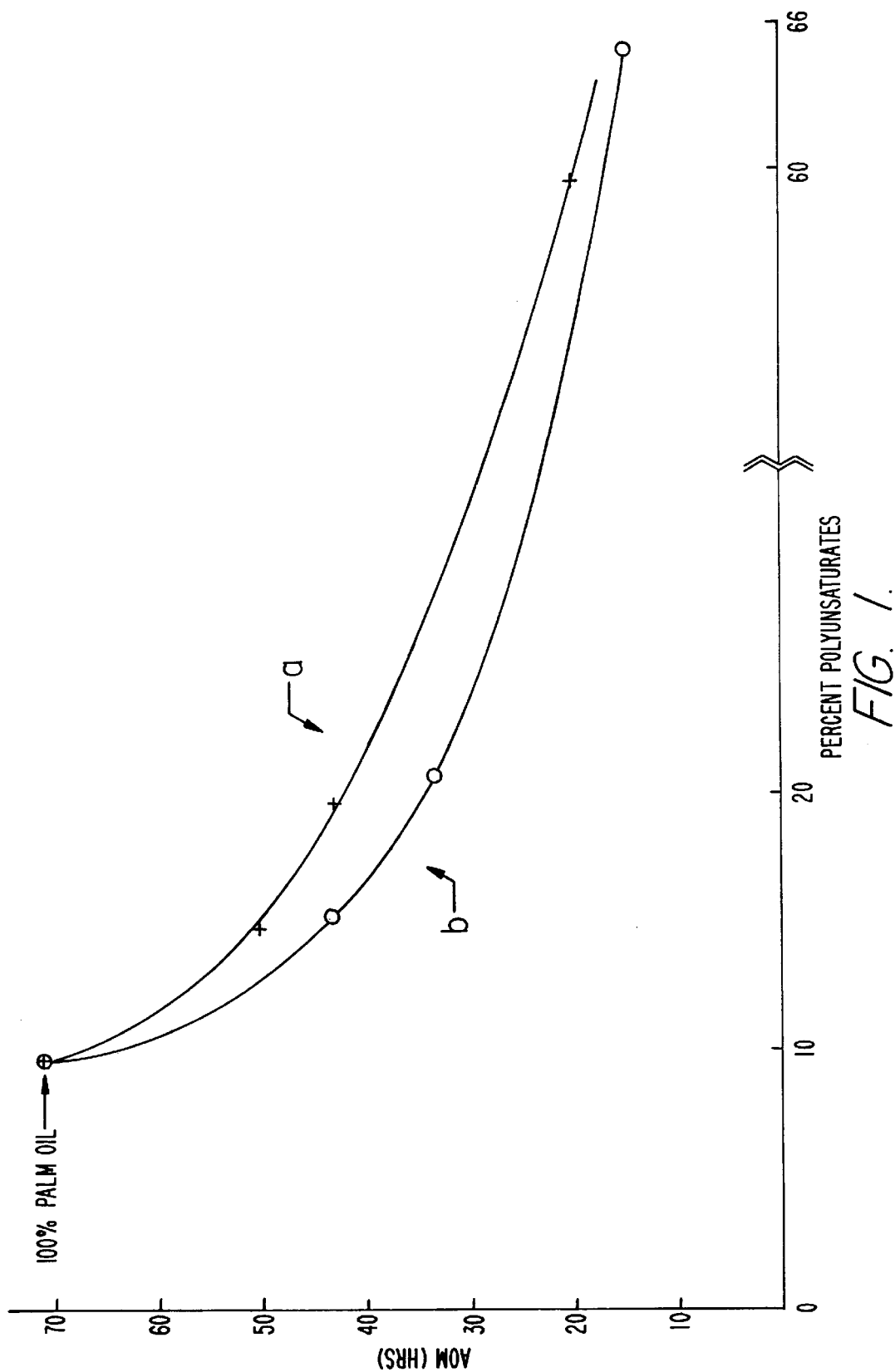
FIG. 1 is a graphical representation of the oxidative stabilities (AOM) of corn oil and soybean oil diluted and blended into palm oil.

As indicated in the Summary above, the present invention concerns a food shortening which is prepared using a blend of palm oil and corn oil. It was found that blends of saturated and unsaturated vegetable oils provided enhanced stablility against oxidation. However, it was found that the palm oil/corn oil blend provided greater stabilization that other tested blends. This result was initially noted in Rancimat tests as summarized in Table I below. The oxidative stability is directly proportional to the Rancimat number provided. A fat blend in which the oxidative stability of the blend is at least 25% greater than that of the polyunsaturated vegetable oil component in the blend is considered an oxidation-resistant blend for the purposes of this invention.

The extent of oxidation-resistance in such blends has been found to vary widely depending upon the type of vegetable oil (e.g., corn versus soybean oil) and the extent of its dilution into the saturated fat such as palm fat. Accordingly, it is apparent from Table I that at higher dilutions of polyunsaturated vegetable oils (e.g., 5-fold and 10-fold dilutions of soybean oil into the palm fats), the fat blends maintains good stability. However, when diluted only 3.3-fold (see 2.3:1 column in Table I), and within the composition range nutritionally useful in the present invention, the oxidative stability of the soybean oil-palm fat blends can fall to approximately the same level as the unblended vegetable oil (cf. 7.6 and 5.6 for the blends versus 6.3 for the soybean oil alone). Surprisingly however, Table I reveals that corn oil can be stabilized against oxidation at both lower (3.3-fold) and higher (5 and 10-fold) dilutions with palm fat. Thus, the oxidative stability of the corn oil-palm blends is at least two-fold greater than the corn oil alone (cf. 11.2 and 9.9 for the lower dilution blends versus 4.8 for the corn oil alone).

TABLE I

OXIDATIVE STABILITY OF FAT BLENDS
(Rancimat method*)

| Polyunsaturated oil | Ratio 9:1 | 4:1 | 2.3:1 |
|---|---|---|---|
| | (Palm olein:Poly-unsatured oil) | | |
| soybean | 16 | 14.4 | 7.6 |
| corn | 16.7 | 13.5 | 11.2 |
| | (Palm oil:Poly-unsaturated oil) | | |
| soybean | 14.4 | 10.2 | 5.6 |
| corn | 15.3 | 12.2 | 9.9 |

OXIDATIVE STABILITY OF PURE FATS AND OILS

| Palm olein | 20 |
|---|---|
| Palm oil | 21.2 |
| soybean oil | 6.3 |
| corn oil | 4.8 |

*The Rancimat method determines the oxidative and thermal stability towards oxidative decomposition in oils and fats. The oil sample is exposed to a stream of atmospheric oxygen at elevated temperatures giving rise to organic acids in the oil/fat. These volatile products are trapped in a measuring vessel filled with distilled water and continuously detected with a conductivity cell. The measurements are then evaluated by a control unit which records the induction time of the sample. The progress of the oxidation curve determined in this manner virtually parallels the development of the peroxide values in the oils being tested.

EXAMPLE 1

Table 1: Superior Oxidation-Resistance of Corn Oil-Palm Fat Blends: A Comparison with Soybean Oil-Palm Fat Blends In confirmation of the Rancimat test results shown above, the oxidation resistance of palm fat/corn oil blends was tested using an appropriate AOCS testing method. Freshly prepared samples of refined, bleached and deodorized palm oil, palm olein and double fractionated palm olein (also termed superolein) were supplied by Fuji Vegetable Oil, Inc. and were combined in varying proportions (9:1 and 8:1 with fresh samples (newly purchased sealed bottles) of either corn oil (Mazola brand oil from Best Foods, Somerset, N.J.) or soybean oil (Wesson brand oil from Hunt-Wesson, Inc., Fullerton, Calif.). Oil stability index (OSI) tests were carried out at the Fuji Vegetable Oil Company, as directed by Applicants at temperatures of 97.8° C. and 110° C. (duplicate samples at each temperature) according to the specified AOCS testing method (12b-92). Oxidative stability results were averaged and converted to AOM units (in hours). In Table II, all numbers are composition percentages (by weight) except the AOM stability value (whose units are in hours). The percentage of polyunsaturated fatty acids is calculated based upon the percentage of linoleic acid plus twice the percentage of linolenic acid in the single oil or blend of oils. This correction factor for linolenic acid takes into account the additional unsaturated chemical bond which proportionately increases the oxidation rate of an oil.

TABLE II

| Percentages | | | Polyunsaturated | |
|---|---|---|---|---|
| | Corn Oil | Soybean Oil | Fatty Acids | AOM (hours) |
| Palm Oil | | | | |
| 100 | 0 | 0 | 9.5 | 71 |
| 90 | 10 | 0 | 14.5 | 50 |
| 90 | 0 | 10 | 15.0 | 43 |
| 80 | 20 | 0 | 19.4 | 43 |
| 80 | 0 | 20 | 20.5 | 33 |
| 0 | 100 | 0 | 59.4 | 20 |
| Palm Olein | | | | |
| 100 | 0 | 0 | 11.7 | 50 |
| 90 | 10 | 0 | 16.5 | 40 |
| 90 | 0 | 10 | 17.0 | 32 |
| 80 | 20 | 0 | 21.2 | 36 |
| 80 | 0 | 20 | 22.3 | 28 |
| 0 | 100 | 0 | 59.4 | 20 |
| Palm Superolein | | | | |
| 100 | 0 | 0 | 14.0 | 40 |
| 90 | 10 | 0 | 18.5 | 38 |
| 90 | 0 | 10 | 19.0 | 33 |
| 80 | 20 | 0 | 23.1 | 34 |
| 80 | 0 | 20 | 24.1 | 28 |
| 0 | 100 | 0 | 59.4 | 20 |

Figure 2:
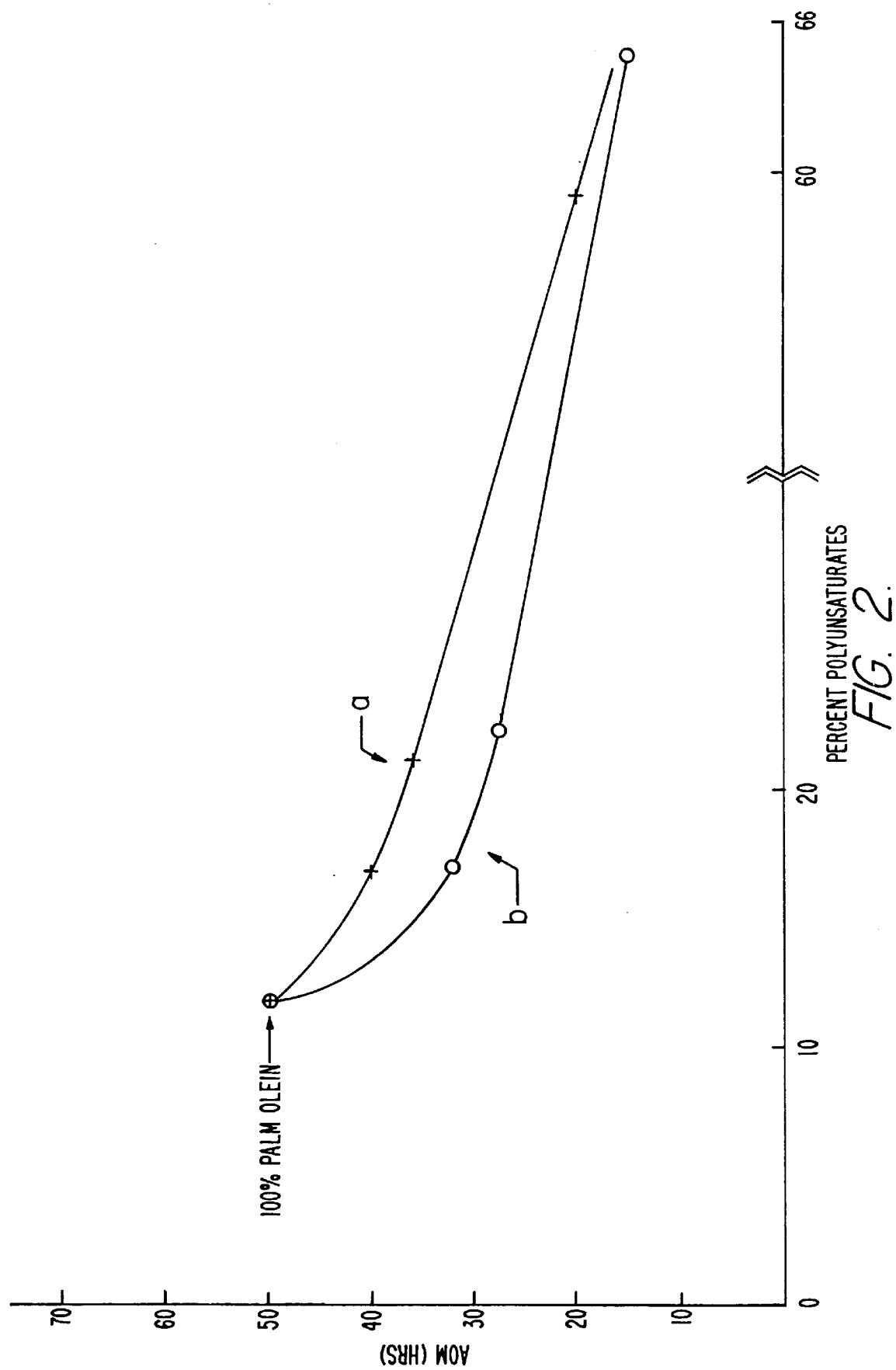
FIG. 2 is a graphical representation of the oxidative stabilities (AOM) of corn oil and soybean oil diluted and blended into palm olein.
Figure 3:
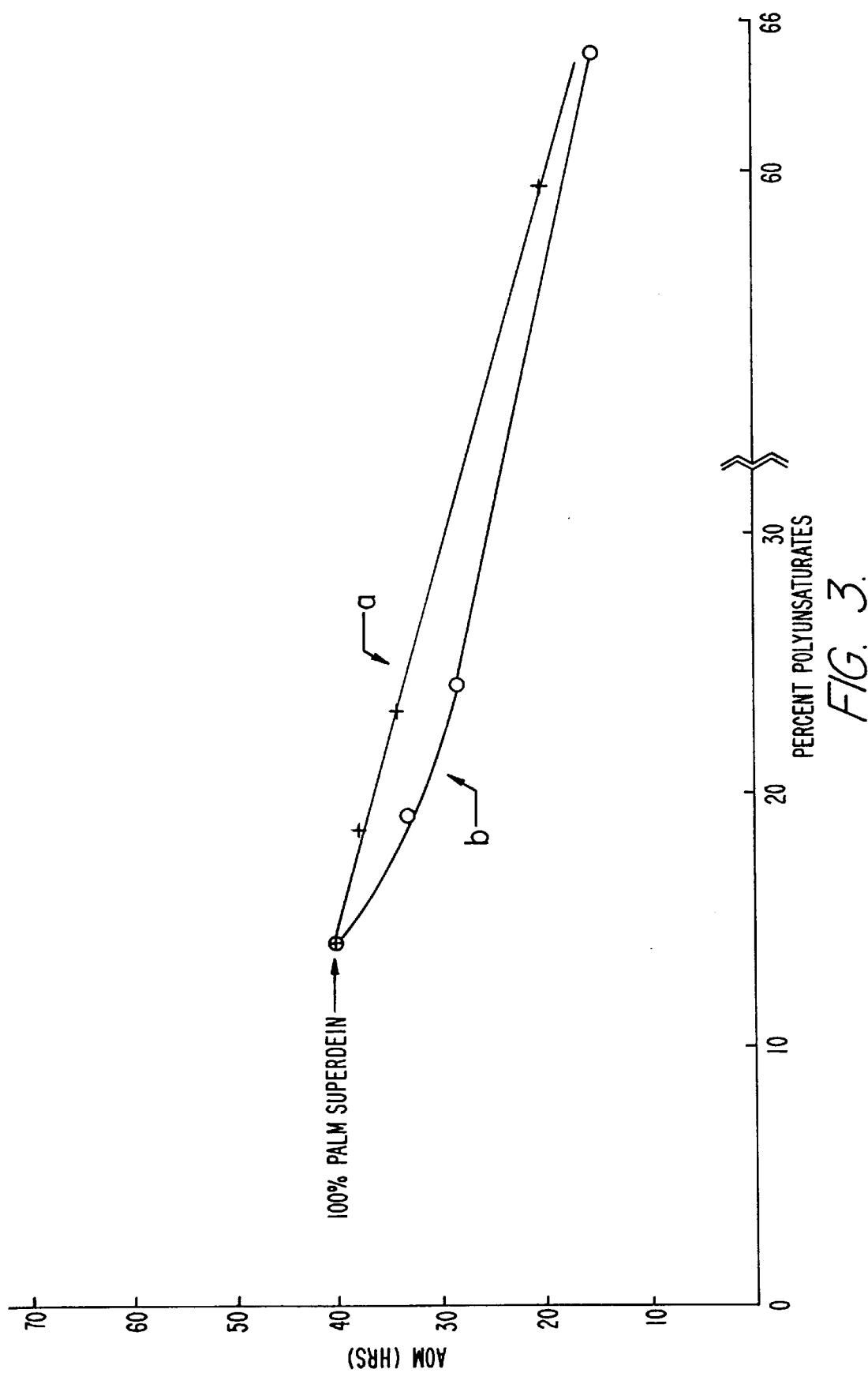
FIG. 3 is a graphical representation of the oxidative stabilities (AOM) of corn oil and soybean oil diluted and blended into palm superolein.

FIGS. 1, 2 and 3.

The data in Table II were divided into corn oil-palm, and soybean oil-palm data sets, and are grapically represented by plotting oxidative stability (AOM) on the y-axis versus the percentage of polyunsaturated fatty acids in the fat, oil, or blended mixture on the x-axis. FIG. 1 shows palm oil blended with corn oil (a) and soybean oil (b). FIG. 2 shows palm olein (single fractionated palm oil) blended with corn oil (a) and soybean oil (b). FIG. 3 shows palm superolein (double fractionated palm oil) blended with corn oil (a) and soybean oil (b).

Observations and conclusions from Table II and FIGS. 1, 2, and 3: With each of the palm fats tested in blends with either corn oil or soybean oil, the corn oil polyunsaturated fatty acids [(a) curves] were stabilized to a greater degree (higher AOM values) than were the soybean oil polyunsaturates [(b) curves]. The reasons for the superior protection of the corn oil polyunsaturates by either palm oil or one or more of its fractionated components (e.g., palm olein, palm superolein, and the like) is still unclear. However, as a result of this superior stabilization against oxidation, corn oil-palm fat blends can provide useful shortenings, especially in the fields of commercial baking and frying. Considering the utility of soybean oil-palm fat blends, and the extensiveness of prior art literature on these blends, it is surprising that corn oil-palm fat blends have not been previously investigated and characterized for their oxidative stability.

Effects of Palm Fat/Corn Oil Blends on Serum HDL Levels and HDL/LDL Ratio

The effects of the dietary intake of particular ratios and combinations of of saturated and unsaturated vegetable fats and oils was described in detail in Sundram et al., U.S. patent application Ser. No. 08/626,461, which was incorporated by reference in its entirety, and is also provided in large part below. The palm fat/corn oil blends of the present invention can be used in the HDL/LDL modifying methods described.

To understand the significance of, and reason for balancing the proportion of saturated and polyunsaturated fatty acids by selecting or engineering a single vegetable oil species, or by blending two or more vegetable oils and/or fats for including in the fat-containing foods mentioned above such as cooking fats, prepared baked foods, dietary foods, and the like, one must understand some of the important parameters governing lipoprotein and cholesterol synthesis and catabolism.

The LDL/HDL ratio, and changes in this ratio depend upon a number of metabolic variables such as hormonal, metabolic, environmental and nutritional perturbations including changing dietary fat compositions which affect lipoprotein levels. Both LDL and HDL are derived, in part, by the catabolic events resulting in the breakdown of VLDL (very low density lipoprotein), the TG (triglyceride)-rich lipoprotein secreted by the liver for the purpose of delivering TG to muscle for energy generation or to adipose tissue for storage. In humans, the breakdown of VLDL is a major source of HDL as well as the primary origin of LDL as described by Grundy et al., 31 *J. Lipid Res.* 1149, 1990. Thus, the potential mass for both HDL and LDL generation is dependent, in part, upon the production rate (mass per unit time) of VLDL secreted by the liver. On the other hand, reduction in the final pool of circulating LDL depends both upon the proportion of the VLDL remnants which are retained and cleared by the liver directly (reducing diversion to LDL) as well as the rate of LDL removal by the liver once LDL is formed. Both VLDL remnants and LDL are cleared via liver receptors ($LDL_r$), and both represent a "sink" for receiving HDL cholesterol esters (CE) via CETP (cholesterol ester transfer protein, see below), thereby reducing the HDL pool once it has been formed. The main function of HDL in this cholesterol-shuttle pathway is to "clean-up" the cholesterol excess "spilled" during VLDL catabolism and then deliver it (as indicated above) as CE either to VLDL remnants or to LDL. These lipoproteins can then carry cholesterol back to the liver for excretion as bile acids (or biliary free cholesterol). Both the catabolism of VLDL involving release of TG, and the CE shuttle from HDL to VLDL-LDL are controlled by proteins that are affected by dietary fat. The former process is modulated by lipoprotein lipase (LPL) and the latter by the transfer protein CETP. These proteins are affected oppositely by the presence of saturated (SAT) and trans (elaidic acid-containing) fats on the one hand, versus polyunsaturated (POLY) fat on the other hand. SAT and trans fats induce increased CETP activity which is associated with increased LDL, and trans fats can even decrease HDL. However POLYs reduce the activity of CETP and enhance LPL activity and favor formation of HDL from VLDL as shown by Demacker et al., 21 *Eur. J. of Clin. Invest.* 197, 1991.

Applicant and other investigators have found that dietary fatty acids consumed in the form of natural fats or fat blends affect different lipoproteins and their concentrations in a number of ways. For example, for more than 30 years it has been appreciated that saturated fat increases total cholesterol (TC), whereas polyunsaturates decrease it, and monounsaturates were thought to be neutral (see Hegsted et al., 17 *Am.J. of Clin. Nutr.* 281, 1965, Hegsted et al., 57 *Am. J. of Clin. Nutr.* 875, 1993, and Heyden, 38 *Ann. Nutr. Metab.* 117, 1994 ). More recently, investigators have focused on nutritional variables by which the different species of lipoproteins, as opposed to TC, are affected. The consensus is that most saturated fatty acids consumed as fats, i.e., twelve to fourteen carbon saturated fatty acids including lauric, myristic, and palmitic acids (12:0, 14:0, and 16:0 respectively), have the potential for elevating both LDL and HDL, although the relative increase in LDL tends to be greater than that for HDL (see Grundy et al., 31 *J. Lipid Res.* 1149, 1990, Pronczuk et al., 8 *FASEB J.*, 1191, 1994, Katan et al., 60 suppl. *Am. J. Clin. Nutr.* 1017S, 1994 and Mensink et al., 12 *Arteriosclerosis and Thrombosis* 911, 1992). Adding to the complexity, 14:0-rich TGs are more cholesterolemic than 16:0-rich TGs (see Hegsted et al., 17 *Am. J. Clin. Nutr.* 281, 1965, Sundram et al., 59 *Am. J. Clin. Nutr.* 841 1994, Hayes et al., 53 *Am. J. Clin. Nutr.* 491, 1991, and Hayes et al., 6 *FASEB J.* 2600, 1992), and the impact of 16:0 is highly dependent on the host "metabolic setpoint" for TC in the serum at the time of intervention. Thus in people with high TC, 16:0 acts as a cholesterol-raising fatty acid, but at TC <200 mg/dl 16:0 typically appears neutral, neither raising nor lowering TC (see Heyden, 38 *Ann. Nutr. Metab.* 117, 1994, and Hayes et al., 53 *Am. J. Clin. Nutr.* 491, 1991). On the other hand, 14:0-rich TGs are always cholesterol-raising, suggesting a different regulatory role for 14:0 and 16:0. Natural TGs, i.e. fats containing the 12:0 fatty acid also contain 14:0, so for all practical purposes they can be considered together (12:0+14:0) and separate from 16:0, which is generally the most prevalent saturated fatty acid in fats derived from plant and animal sources, often without any 12:0+14:0. Surprisingly, stearic acid (18:0) seems to be neutral in its regulatory behavior over TC (see Hegsted et al., 57 *Am. J. Clin. Nutr.* 875, 1993 and Katan et al., 60 suppl. *Am. J. Clin. Nutr.* 1017S, 1994).

Only one fatty acid, linoleic acid (18:2n6 or 18:2), is generally acknowledged to be cholesterol-lowering. As an essential or required dietary polyunsaturated fatty acid, it alone among all of the POLYs [including linolenic or 18:3n3, eicosapentenoic (EPA) or 20:5n3, and docosahexenoic acid (DHA) or 22:6n3] consistently lowers TC, especially lowering LDL-C but also decreasing HDL-C at high dietary intake of POLYs (Grundy et al., 31 *J. Lipid Res.* 1149, 1990, Hegsted et al., 17 *Am. J. Clin. Nutr.* 281, 1965, and Hegsted et al., 57 *Am. J. Clin. Nutr.* 875, 1993). In fact, this tendency for 18:2 to lower HDL has even led to warnings against recommending POLYs as a means for lowering TC. Rather, the recommendation has been offered that monounsaturated fats (MONOs) containing oleic acid (18:1) should replace saturated fat as much as possible because MONOs do not lower HDL like POLYs do, and replacing saturates with MONOs will primarily lower LDL as suggested by Grundy et al., 31 *J. Lipid Res.* 1149, 1990.

As applicant will describe below, the later statement is true, but it ignores the critical role of POLYs, and the fact that it is a critical balance between dietary intake of SATs and POLYs (both at moderate intake) which actually allows HDL to increase to yield the highest serum HDL/LDL ratio, at least in humans with normal cholesterol metabolism.

Over the past few years a number of nutritional experiments using animal models and humans are relevant to Applicant's finding of fatty acid proportions required for generating the highest HDL/LDL ratio. The first relevant study was in monkeys (Hayes et al., 53 *Am. J. Clin. Nutr.* 491, 1991). In that report it was found that for SATs, 16:0 increased TC less than 12:0+14:0, but quite surprisingly 16:0 had an effect on TC very similar to POLYs (18:2) when 5% of the daily dietary calorie intake (abbreviated 5% en) was exchanged between these 2 fatty acids (between 5–10% en as 18:2, ie. Diets 4 vs. 5 in the cited study). At the time of the study, the authors failed to appreciate the significance of the fact that once 5% en as 18:2 in the daily diet has been achieved, additional dietary 18:2 does not really exert much effect on TC and can be exchanged for other "neutral" fatty acids without altering TC appreciably. This relationship has been described as the "threshold effect" for 18:2 (Hayes et al., 6 *FASEB J.* 2600, 1992 and Pronczuk et al., 8 *FASEB J.* 1191, 1994).

In a second study in rhesus monkeys (Khosla et al., 1083 *Biochem. et Biophys. Acta* 46, 1991), the authors explored possible metabolic reasons for differences observed in TC during the exchange of (16:0+18:1) for (12:0+14:0) [Diet 4 versus Diet 2 in the cited study]. It was found that the former fatty acids (16:0+18:1) led to 3-fold more VLDL output than the (12:0+14:0) diet, and that the (12:0+14:0) diet produced a larger LDL pool and a poorer (lower) HDL/LDL ratio. The authors interpreted this to mean that dietary (12:0+14:0) fatty acids were worse than 16:0 (and 18:1) in terms of raising LDL, presumably because (12:0+14:0) down-regulate the $LDL_r$ making it difficult for VLDL remnants and LDL particles to be cleared by the liver. This ultimately causes LDL to accumulate.

In a third monkey study (Khosla et al., 55 *Am.J. Clin. Nutr.* 51, 1992) the effect of high dietary intake of SAT 16:0 in the form of palm oil, versus high dietary intake of MONO 18:1 in the form of high oleic safflower oil, and also versus high dietary intake of POLY 18:2 in the form of high linoleic safflower oil was examined. Here the TC response was animal species specific, with all three fats causing an equal TC response in rhesus. However the high dietary 18:2 (at 30% en) produced lower TC in the cebus species by virtue of an undesirable depressed HDL-C level while the LDL-C was unaffected by all three diets in both species. These data indicated that genetic differences can affect the sensitivity to 18:2 in the diet, but that 16:0, 18:1, and 18:2 can appear to exert similar effects when lipoprotein metabolism is unimpaired and when essentially no dietary cholesterol is present to interfere with LP metabolism (especially by decreasing LDL receptor number and LDL clearance rate).

An interesting observation and measurement recorded in the above cited study and unexplained until now was a favorable HDL/LDL ratio which was greater in monkeys fed the 16:0-containing SAT diet than the MONO or POLY diet. This observation contradicted the generally held belief that dietary SATs should be avoided in favor of POLYs and MONOs. However, this early measurement taken together with the more extensive new data provided in Appendix I now indicate that saturated fatty acids are a necessary dietary component for increasing HDL and increasing the HDL/LDL ratio in the serum.

In other previous experiments using saturated animal fats blended with POLYs described in Perlman and Hayes, supra, it is noted that rodents (gerbils and hamsters) and monkeys (cebus) exhibited unexpectedly increased HDL/LDL lipoprotein ratios when corn oil (rich in 18:2) was blended into animal fats stripped of cholesterol. These data are also consistent with the model now proposed in which a balanced ratio of SATs and POLYs in the diet may be the most important consideration in modulating lipoproteins to increase HDL and maximize the HDL/LDL ratio.

The discovery confirming and validating applicant's new model appears in the human nutritional study involving three different diets described in Sundram et al. (hereby incorporated by reference in totality, *Nutrional Biochemistry* Vol 6:179–187, 1995).

These diets included one containing low dietary SATs combined with moderate POLYs and high MONOs (canola oil diet-abbreviated CAN), a second containing high dietary SATs combined with low POLYs and moderate MONOs (palm olein-abbreviated POL), and a third containing moderate dietary SATs combined with moderate POLYs and moderate MONOs (soybean oil-palm olein-canola oil blend-abbreviated AHA). Indeed, all three fat-containing diets produced equal TC and similar LDL-C, but the AHA fat blend increased HDL-C by 20% (see Table III) relative to the other two diets. Thus, Applicant unexpectedly discovered that normolipemic people (i.e., people with normal lipoprotein metabolism and exhibiting serum TC values of <200 mg/dl) appear to require moderate levels of both SATs and POLYs which, in appropriate total dietary amounts, produce an increased HDL concentration and increased HDL/LDL ratio in the serum.

In order to provide a general method for maximizing the HDL/LDL ratio in human serum it is useful to understand the physiological basis by which the HDL/LDL ratio may be altered. Returning to FIG. 1 and the experimental observations reported on herein, it appears that SATS (16:0 in the above diet) drive VLDL output, maximizing the potential for HDL production (i.e., increasing the HDL precursor pool of VLDL). Since high dietary levels of MONOs did not increase HDL while moderate levels of SATs did increase HDL, it would appear that 16:0 (not 18:1) may have been responsible for the greatest VLDL output in the previous rhesus study (Khosla et al., 55 *Am. J. Clin. Nutr.* 51, 1992). Secondly, it seems that an adequate intake of POLYs [which must exceed the 3.3% en shown to be suboptimal in the low-POLY diet in the appendix is needed to assure up-regulated or stimulated $LDL_r$ activity. This level of POLYs is estimated to be at least 5–6% en and has been described elsewhere as "assuring the 18:2 threshold requirement" (Hayes et al., 6 *FASEB J.* 2600, 1992 and Pronczuk et al., 8 *FASEB J.* 1191, 1994). This intake of POLYs also assures that VLDL catabolism and LDL clearance proceeds efficiently and rapidly (decreasing plasma LDL) while sparing the need for HDL "clean-up" (ultimately increasing available HDL). Viewed as a balancing process, adequate SATs are needed to enhance HDL precursor output (as VLDL) and adequate POLYs are needed to keep LDLr up-regulated to enhance LDL and VLDL remnant clearance by the liver. Together this combination results in the highest HDL and lowest LDL levels in the serum. To applicant's knowledge neither this combination of fatty acids nor this rationale for metabolic function has ever been recognized, let alone demonstrated in humans prior to this time.

The importance of diversifying the dietary intake of polyunsaturated fatty acids to include one or more of the omega3 polyunsaturates [i.e., α-linolenic acid (18:3, omega3), eicosapentenoic acid (EPA) and docosahexenoic acid (DHA)], in addition to linoleic acid (18:2, w6), has recently been pointed out by Charnock et al. ($3^{rd}$ Int. Symp. on Lipid Metabolism in the Normal and Ischemic Heart, September 1991) and by M$^c$Lennan et al. (19 Aust. NZ J. Med. 1, 1989). According to these investigators, adding the above-mentioned omega3 polyunsaturated fatty acids to the diet improved the mechanical performance and the electrical stability of the marmoset heart. In this animal model the incidence of ventricular fibrillation was reduced while ventricular ejection, peak filling rate and end diastolic volume increased when compared to animals fed similar diets containing only polyunsaturates of the w6 type, e.g., linoleic acid. In marmosets fed saturated animal fats in place of comparable amounts of sunflower oil (linoleic acid-rich oil) or fish oil (omega3-rich oil), cardiac performance deteriorated significantly with respect to both mechanical and electrical parameters.

As taught in the present invention, there are several straightforward means of providing a mix, and controlling the balance of saturated and polyunsaturated fatty acids in ones daily dietary fat. In the extreme case, the strictly controlled use of liquid and/or solid dietary formulations which provide all of the dietary fat can be used to insure this balance. In a moderately controlled setting, institutional preparation of food for resident populations allows the monitored use of fats, e.g., hospital, university, and military kitchens, in which appropriately balanced fat blends can be used throughout the food preparation scheme. In addition, manufacturers of prepared food such as commercial bakers can use appropriately balanced blends of fats and oils.

EXAMPLE 2

Fat Blends for Increasing the HDL Concentration and the HDL/LDL Ratio

Two parts palm oil (44% palmitic acid, 9% linoleic acid) are blended with one part corn oil (11% palmitic acid, 58% linoleic acid) to provide a balanced fat blend containing approximately 33% palmitic acid (16:0) and 25% linoleic acid (18:2). When consumed as the principal and essentially the sole source of dietary fat in the daily diet, and representing approximately 30% of the dietary energy this fat blend will increase the level of HDL cholesterol in human serum and the HDL/LDL ratio compared to a similar diet in which the proportion of either palmitic acid or linoleic acid is 3-fold lower.

Other embodiments are within the following claims.

We claim:

1. An oxidation-resistant food shortening comprising a blended vegetable fat composition, wherein said composition comprises between 50% and 95% by weight non-hydrogenated palm fat and between 5% and 50% non-hydrogenated corn oil, wherein the oxidation resistance of said corn oil is enhanced by the blending of said palm fat and said corn oil.

2. The shortening of claim 1,
   wherein the polyunsaturated fatty acids from said corn oil are better stabilized against oxidation by blending with said palm fat than with an equivalent weight percentage of polyunsaturated fatty acids from soybean oil.

3. The shortening of claim 1,
   wherein said palm fat is selected from the group consisting of palm oil, palm olein, palm superolein, palm midfraction, palm stearin and palm kernel oil.

4. The shortening of claim 1, further comprising
   at least one fat-dispersible additive selected from the group consisting of antioxidants, antifoam agents, stabilizers, and emulsifiers.

5. The shortening of claim 1,
   wherein said shortening is resistant to heat-accelerated oxidation and is incorporated into a heat-prepared food selected from the group consisting of baked foods and fried foods.

6. The shortening of claim 1, wherein said shortening contains less than 1% unnatural trans-fatty acids.

7. The shortening of claim 1, wherein the ratio of said palm fat to said corn oil is between 9:1 and 4:1.

8. The shortening of claim 1, wherein the ratio of said palm fat to said corn oil is between 9:1 and 2.3:1.

9. A fat-containing prepared food, comprising an oxidation-resistant food shortening comprising a blended vegetable fat composition, wherein said blended vegetable fat composition comprises between 50% and 95% by weight non-hydrogenated palm fat and between 5% and 50% non-hydrogenated corn oil, wherein the oxidation resistance of said corn oil is enhanced by the blending of said palm fat and said corn oil,
   wherein the shelf-life of said prepared food is extended by the incorporation of said shortening.

10. The fat-containing prepared food of claim 9, wherein said food is selected from the group consisting of baked food, fried food, dessert food, margarine, salad dressing, and mayonnaise.

11. A method of increasing the polyunsaturated fatty acid content of a palm fat-containing shortening while minimizing the loss in oxidative stability of said shortening, comprising the step of
   supplementing said palm fat with between about 5% and 100% by weight corn oil.

12. A method of increasing the polyunsaturated fatty acid content of a palm fat-containing prepared food composition while minimizing the loss in oxidative stability of said prepared food composition, comprising the step of
   supplementing said palm fat with between about 5% and 100% by weight corn oil.

13. A method of sustaining or increasing the HDL concentration and increasing the HDL/LDL concentration ratio in human serum by providing a balance between a sufficient and required proportion of cholesterol-free saturated fatty acids in the daily dietary fat of said human and a sufficient and required, but not excessive proportion of polyunsaturated fatty acids comprising linoleic acid in said dietary fat, while the remaining proportion of fatty acids and energy from said dietary fat is provided by monounsaturated fatty acids comprising oleic acid, said method comprising ingesting said dietary fat, wherein said saturated fatty acids preferably constitute between 20% and 40% by weight of said daily dietary fat based upon said dietary fat accounting for 30% of the total dietary energy consumption, and wherein said linoleic acid constitutes between 15% and 40% by weight of said dietary fat,
   wherein at least 20% of said daily dietary fat is provided by fat-containing prepared foods comprising an oxidation-resistant food shortening comprising a blended vegetable fat composition, wherein said composition comprises between 50% and 95% by weight non-hydrogenated palm fat and between 5% and 50% non-hydrogenated corn oil, wherein the oxidation resistance of said corn oil is enhanced by the blending of said palm fat and said corn oil.

14. The method of claim 13, wherein the proportion of monounsaturated fatty acids in the daily dietary fat is between 20% and 50% oleic acid and no greater than 1% elaidic acid, or other unnatural trans fatty acids by weight.

15. A method of decreasing the LDL concentration in human serum by providing saturated fatty acids in the daily diet in a proportion between 20% and 40% by weight of the daily dietary fat based upon said dietary fat accounting for 30% of the total dietary energy consumption, and maintaining a proportion of polyunsaturated fatty acids comprising linoleic acid in the daily diet at the expense of monounsaturated fatty acids comprising oleic acid and/or elaidic acid, wherein said linoleic acid constitutes between 15% and 40% by weight of said dietary fat, said method comprising the step of ingesting said dietary fat,
   wherein at least 20% of said daily dietary fat is provided by fat-containing prepared foods comprising an oxidation-resistant food shortening comprising a blended vegetable fat composition, wherein said composition comprises between 50% and 95% by weight non-hydrogenated palm fat and between 5% and 50% non-hydrogenated corn oil, wherein the oxidation resistance of said corn oil is enhanced by the blending of said palm fat and said corn oil.

16. A method of sustaining or increasing the HDL and decreasing the LDL concentration in human serum by providing saturated fatty acids in the daily diet in a proportion between 20% and 40% by weight of the daily dietary fat based upon said dietary fat accounting for 30% of the total dietary energy consumption, wherein the production of VLDL, as the HDL precursor, is adequately sustained and is not rate limiting in HDL biosynthesis, and maintaining a proportion of polyunsaturated fatty acids comprising linoleic acid in the daily diet at the expense of monounsaturated fatty acids comprising oleic acid and/or elaidic acid, wherein said linoleic acid constitutes between 15% and 40% by weight of said dietary fat, said method comprising the step of ingesting said dietary fat, wherein at least 20% of said daily dietary fat is provided by fat-containing prepared foods comprising an oxidation-resistant food shortening comprising a blended vegetable fat composition, wherein said composition comprises between 50% and 95% by weight non-hydrogenated palm fat and between 5% and 50% non-hydrogenated corn oil, wherein the oxidation resistance of said corn oil is enhanced by the blending of said palm fat and said corn oil.

17. A method of sustaining or increasing the HDL concentration and increasing the HDL/LDL concentration ratio in human serum by the dietary consumption of foods prepared using an oxidation-resistant cholesterol-free food shortening comprising a blended vegetable fat composition, wherein said composition comprises between 50% and 95% by weight non-hydrogenated palm fat and between 5% and 50% non-hydrogenated corn oil, wherein the oxidation resistance of said corn oil is enhanced by the blending of said palm fat and said corn oil, containing a ratio of one part by weight polyunsaturated fatty acids to at least one part by weight saturated fatty acids, wherein said shortening comprises linoleic acid and at least one saturated fatty acid selected from the group including lauric acid, myristic acid, and palmitic acid, said linoleic acid constituting between 15% by weight and 40% by weight of said composition and said saturated fatty acid constituting between 20% and 40% by weight of said composition, said method comprising the step of ingesting said foods.

\* \* \* \* \*